United States Patent [19]

Sodos

[11] Patent Number: 5,251,312
[45] Date of Patent: Oct. 5, 1993

[54] METHOD AND APPARATUS FOR THE PREVENTION OF RACE CONDITIONS DURING DYNAMIC CHAINING OPERATIONS

[75] Inventor: Martin Sodos, San Jose, Calif.

[73] Assignee: Sun Microsystems, Inc., Mountain View, Calif.

[21] Appl. No.: 814,864

[22] Filed: Dec. 30, 1991

[51] Int. Cl.$^5$ .............................................. G06F 13/00
[52] U.S. Cl. ..................................... 395/425; 395/275; 364/238.4; 364/242.3; 364/242.31; 364/247.6; 364/247.7; 364/248.1; 364/251; 364/251.5; 364/260; 364/260.8; 364/262.4; 364/262.5; 364/DIG. 1
[58] Field of Search ............... 395/275, 325, 375, 425, 395/550, 800

[56] References Cited

U.S. PATENT DOCUMENTS

| | | | |
|---|---|---|---|
| 3,898,623 | 8/1975 | Cormier | 395/275 |
| 4,688,221 | 8/1987 | Nakamura et al. | 395/425 |
| 4,797,812 | 1/1989 | Kihara | 395/425 |
| 4,807,112 | 2/1989 | Hamasaki | 395/425 |
| 4,920,480 | 4/1990 | Murakami et al. | 395/800 |
| 4,930,065 | 5/1990 | McLagan et al. | 395/425 |
| 4,979,096 | 12/1990 | Ueda et al. | 395/425 |
| 4,989,113 | 1/1991 | Hull, Jr. et al. | 395/425 |
| 4,999,769 | 3/1991 | Costes et al. | 395/550 |
| 5,027,310 | 6/1991 | Dalrymple | 364/770 |
| 5,072,374 | 12/1991 | Sexton et al. | 395/800 |
| 5,099,417 | 3/1992 | Magar et al. | 395/425 |
| 5,131,082 | 7/1992 | Bonevento et al. | 395/375 |

Primary Examiner—Michael R. Fleming
Assistant Examiner—Ayaz R. Sheikh
Attorney, Agent, or Firm—Blakely Sokoloff Taylor & Zafman

[57] ABSTRACT

In the system of the present invention, the limitations imposed by the physical limitations of the DMA controller are overcome by storing the channel control blocks in external memory. The DMA controller is programmed to reference a particular address of external memory when a predetermined bit in the current channel control block is set. The DMA controller will then perform a memory read operation on the area of memory referred to by that address in order to store the retrieved channel control block at a location previously utilized by a earlier channel control block. This reading process will continue until the bit is reset, at which time the DMA operation is complete. Dynamic chaining is accommodated whereby the channel control blocks can be dynamically changed during the DMA access to provide a flexible I/O system. Furthermore, a method and apparatus for implementing dynamic chaining without incurring race conditions is described. A wait bit in each channel control block is provided when this bit is set, the DMA controller will suspend operations thereby providing opportunity for updating the chain of CCBs without incurring errors due to race conditions. Once the chain has been modified, the wait bit is reset and processing safely continues.

12 Claims, 8 Drawing Sheets

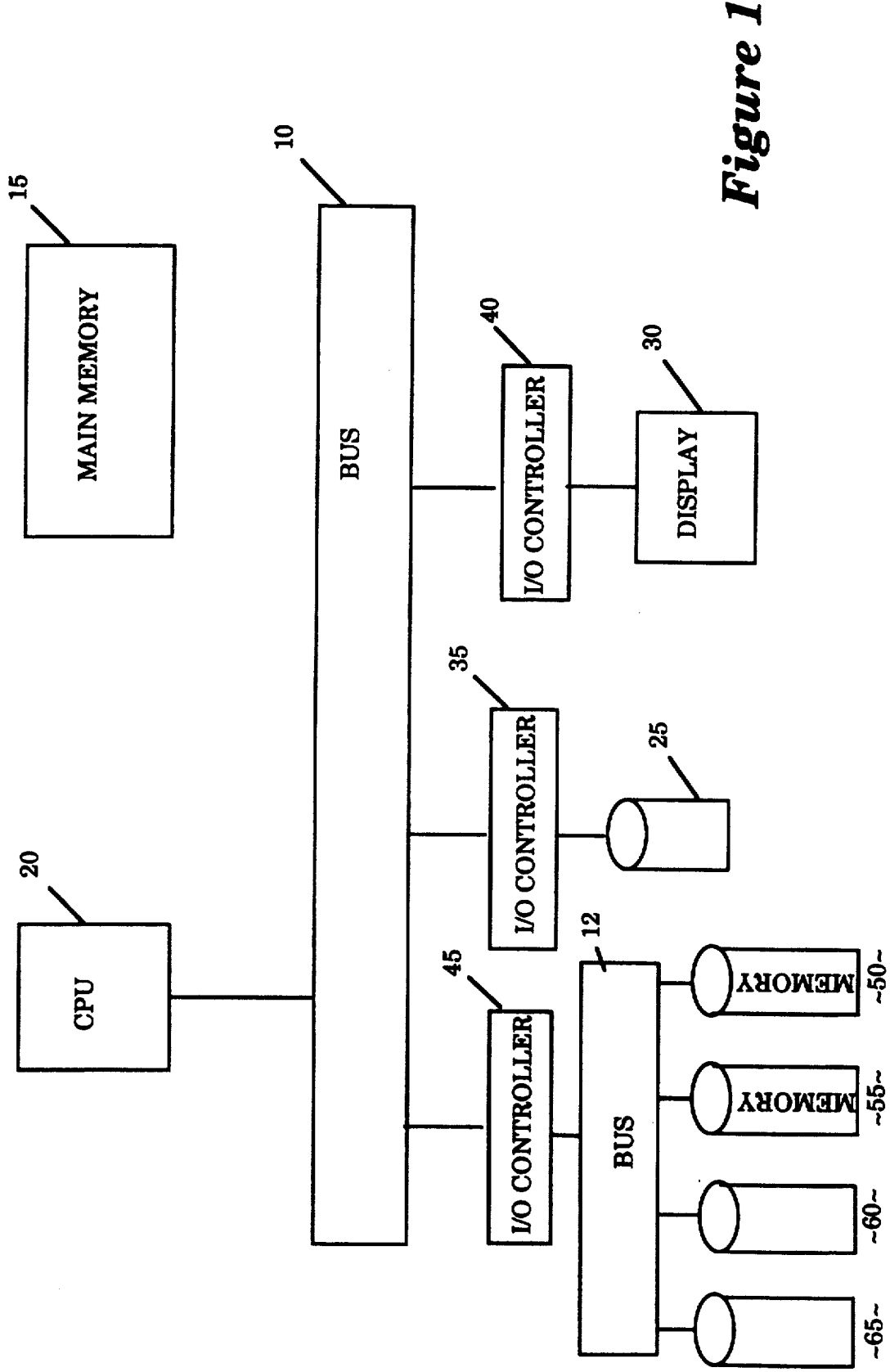

CCR

| Db1 | Db0 | Sb1 | Sb0 | Dai | Sai | DaO | SaO | Dec | Sec | Dih | Sih | DXt | Mo1 | Mo0 |
|-----|-----|-----|-----|-----|-----|-----|-----|-----|-----|-----|-----|-----|-----|-----|

47                                                                              32

| Dack | Dack | Sack | Sack | DPs1 | DPs0 | DMu | D Sync | SPs1 | SPs0 | SMu | S Sync |
|------|------|------|------|------|------|-----|--------|------|------|-----|--------|
|      | 1    | 1    | 0    |      |      |     |        |      |      |     |        |
|      | 0    | 0    | 0    |      |      |     |        |      |      |     |        |

METHOD AND APPARATUS FOR THE PREVENTION OF RACE CONDITIONS DURING DYNAMIC CHAINING OPERATIONS

RELATED APPLICATIONS

The present patent application is related to pending patent applications, entitled "A CIRCUIT ARCHITECTURE FOR SUPPORTING MULTIPLE-CHANNEL DMA OPERATIONS," Ser. No. 07/814,765, now pending and "METHOD OF AND APPARATUS FOR INTERLEAVING MULTIPLE-CHANNEL DMA TRANSFERS," Ser. No. 07/814,766, now pending "METHOD AND APPARATUS FOR THE CHAINING OF DMA OPERATIONS," Ser. No. 07/815,802 now pending, all filed on the same date as the present patent application.

BACKGROUND OF THE INVENTION

Direct memory access (DMA) is a method for direct communication from a peripheral (I/O device) to memory or directly between peripheral devices. Utilizing DMA, bytes are moved by the DMA controller without CPU intervention. In order to perform DMA operations, an I/O channel is provided with an I/O or DMA controller which gains control of the bus (or busses), accesses the devices and notifies the CPU that the memory operation has been completed. DMA controllers operate in accordance with either channel control blocks (CCBs) or channel programs which are used to specify various operating parameters of DMA transfer such as the data location and data size.

The use of CCBs provides for the more efficient storage, transfer and execution of the DMA parameters to the DMA channel and does not restrict the number of pages that are to be a part of the I/O transaction. The DMA controller is equipped with an additional register referred to as the data chain register (DCR) which contains a pointer to a chain of a predetermined number of blocks of DMA channel control parameters located in the main memory of the DMA controller. A flag in the DMA parameter block indicates whether chaining to a subsequent block should be continued. However, the number of channel control blocks that may be chained together is limited by the amount of memory allocated on the DMA controller chip for storage of channel control blocks and may typically be only enough room to store two or three channel control blocks.

An alternative method for providing chaining is to provide the DMA controller with a memory and processor to execute microcode stored in the memory. In systems that employ this method, such as the IBM 7090, 7080 and System 360 manufactured by International Business Machines, Armonk, N.Y., an Input/Output (I/O) transaction is started by issuing a Start I/O (SIO) instruction. The instruction provides the effective address which points to the channel program to operate the I/O device. A channel program is then fetched from memory starting at the SIO effective address. Two types of information is transferred by the channel program: blocks of data and channel instructions. Channel instructions include a stop instruction and jump instruction. The stop instruction completes the I/O transaction and the jump instruction changes the address of the next instruction of the channel program to be executed.

In order to provide a more powerful and flexible controller, the technique of dynamic chaining was developed. Dynamic Chaining permits on-the-fly chaining of I/O commands to the channel program. To achieve dynamic chaining, an addendum to the channel program is created by inserting a jump instruction before the last instruction, the stop instruction, of the channel program. The jump instruction points to another location in memory which contains the I/O command(s) added to the chain. Although this technique provides the capability of dynamically chaining instructions, a race condition arises due to the difficulty in ensuring that the change in the microcode is written prior to the code execution reaching the point of the change.

SUMMARY OF THE INVENTION

It is therefore an object of the present invention to provide a system of direct memory access in which the channel control blocks are stored in external memory.

It is an object of the present invention to provide a DMA controller to implement dynamic chaining of channel control blocks which are stored in external memory.

It is an object of the present invention to provide a DMA controller to implement dynamic chaining which prevents the occurrence of race conditions.

In the system of the present invention, a new method of implementing dynamic chaining is provided which provides more reliable operation, free of the conditions and limitations of the previous methodologies. The limitations imposed by the physical limitations of the DMA controller are overcome by storing the channel control blocks in external memory. The DMA controller is programmed to reference a particular address of external memory when a predetermined bit in the current channel control block is set. The DMA controller retrieves the channel control block at that address in external memory and performs a memory operation on that area of memory to store the retrieved channel control block at the location previously utilized by a earlier channel control block. This process continues until a channel control block is reached which has the bit reset at which time the DMA operation is complete. Thus, in the system of the present invention, dynamic chaining is easily accommodated as the channel control blocks can be dynamically changed during the DMA access to provide a flexible I/O system simply by updating the external memory.

Furthermore, a method of dynamic chaining is provided in which race conditions which frequently occur are avoided. Each channel control block is provided with an additional status bit, referred to as a wait bit. When the wait bit is set, the transfer is completed for the current CCB and the system suspends operations and waits until the wait bit is reset. This ensures that there is sufficient time to add the CCB(s) desired to the chain. Once the CCB(s) have been added, the wait bit is reset whereby normal processing continues. A suspend status bit is also provided in the channel operations register (COR) located in the control status register (CSR). When the suspend bit is set, execution of the current CCB is suspended regardless of the status of the wait bit of the current CCB. Once the suspend bit is reset, normal processing continues.

BRIEF DESCRIPTION OF THE DRAWINGS

The objects features and advantages of the present invention will be obvious to one skilled in the art in light of the following description in which:

FIG. 1 is a block diagram illustration of an exemplary system in accordance with the present invention.

FIG. 3a and 3b illustrates the channel control block registers that are used to specify various operating parameters of the channel.

DETAILED DESCRIPTION OF THE INVENTION

Figure 2A:
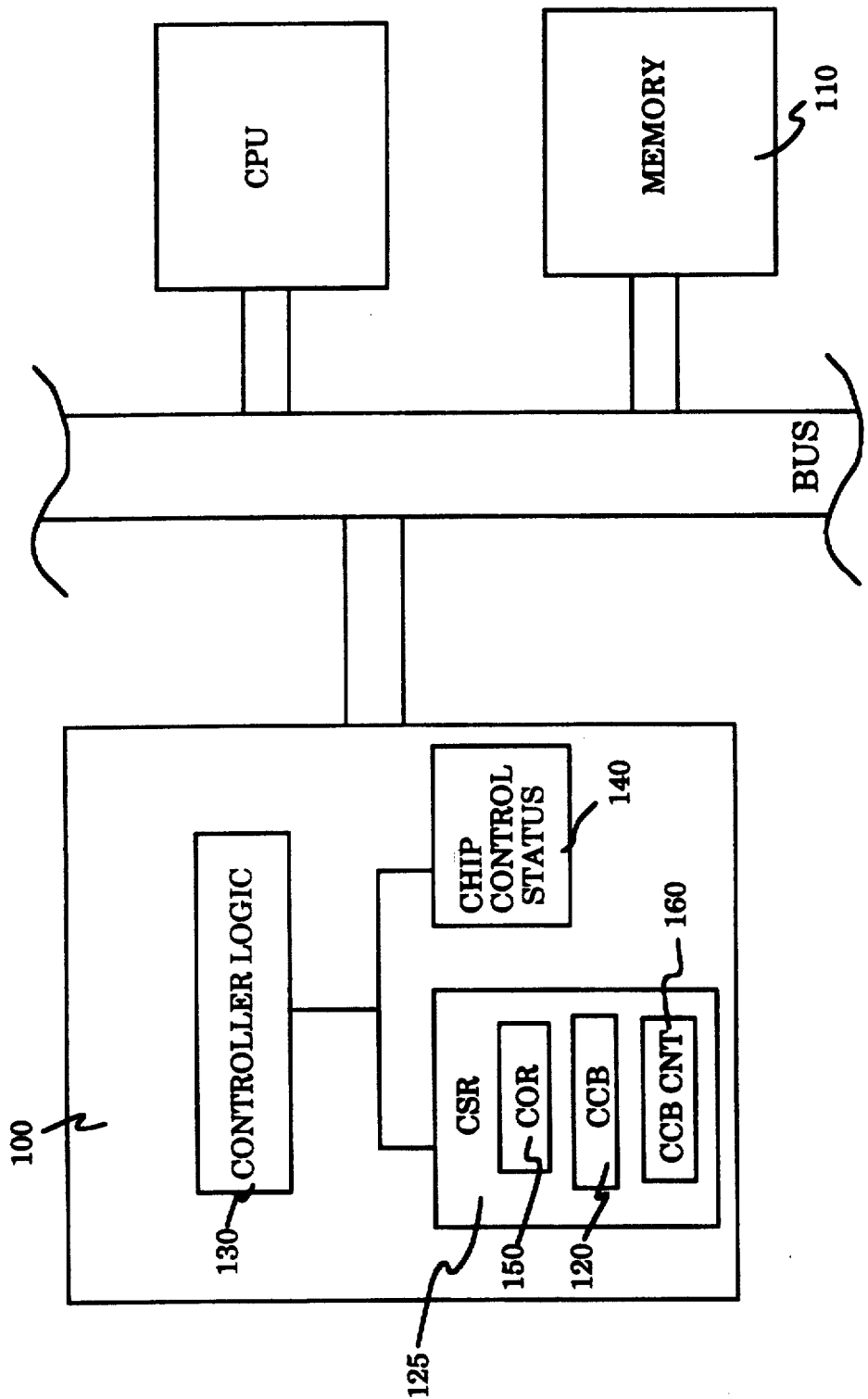
FIG. 2a and 2b are block diagram representations of two embodiments of the system of the present invention.

In the following description for purposes of explanation, specific storage devices, system organizations, architectures, etc. are set forth in order to provide a thorough understanding of the present invention. However, it will be apparent to one skilled in the art that the present invention may be practiced without these specific details. In other instances, well known circuits and systems are shown in block diagram form in order not to obscure the present invention unnecessarily.

The typical system which operates in accordance with the present invention is shown in FIG. 1. A bus 10 interconnects a plurality of devices including main memory 15, CPU 20 and I/O devices 25 and 30. The I/O controller 35, 40 provides that interface to the bus 10 as well as control of the input and output to the actual device 25, 30. I/O controller 45 is further attached to a second bus 12 to which additional memory 50, 55 and I/O devices 60, 65 are connected. In the system of the present invention, the I/O controllers 35, 40, 45 are provided with the intelligence to perform DMA operations. In response to a request to perform a DMA operation, the I/O controller accesses the space allocated in its internal memory at a predetermined address to access a channel control block used to specify the operating parameters of the channel for the operation. Once the parameters are accessed, the I/O controller is ready to perform the direct memory access operation in accordance with the parameters supplied. For more information on direct memory access see, for example, *Computer Architecture and Design*, by A. J. van de Goor (Addison-Wesley, Publishers, 1989), pages 317 to 321.

Referring to FIG. 2a, in the present invention, means are provided in the I/O controller 100 to specify and enable access to channel control blocks (CCBs) stored in external storage or memory devices, such as memory 110. During execution of chains of CCBs, the I/O controller 100 accesses the external storage device 105 to retrieve a channel control block and stores it in the memory of the I/O controller 100 at the location allocated for a channel control block 120, which in the preferred embodiment is located in the control status register (CSR) 125. Subsequently, a DMA operation will take place in accordance with the channel control block parameters. Once the operation is complete, the I/O controller 100 retrieves the next channel control block, if one exists, stores it in the CCB location 120 in the CSR 125 and continues processing in this manner until all the channel control blocks have been processed. Thus, a large number of channel control blocks can be stored in an external storage device and retrieved during execution of DMA operations thus exceeding the limitations placed on the I/O controller 100 by the small amount of memory allocated for the CCB 120, and gaining a significant processing advantage by providing the means for performing multiple DMA operations without CPU intervention.

Additional status bits are provided in each CCB. The I/O controller logic 130 is modified to examine the additional status bits and perform predetermined functions if the bits are set/reset. These additional bits include a chain bit. The chain bit is set if the controller logic 130 is to perform a read operation to external memory to retrieve the next sequential channel control block of the chain. The retrieved CCB is then written into the I/O controller memory at the predetermined location of the CCB, overwriting the CCB just executed by the DMA controller. The controller will then perform the operation specified by the CCB retrieved and written to the CCB register in the controller memory.

The controller logic performs a read to external memory at the address indicated by the external memory address pointer located in the controller, preferably located in the chip control status block 140. Preferably the external memory address pointer is a hard coded value which points to the first CCB located in external storage. A CCB counter register 160 maintains a count of the number of CCBs in a chain that have been executed for a channel. As the CCBs are of a fixed size, the location of the CCB to be retrieved may be determined according to the memory address pointer and the number of CCBs executed. Alternatively, the external memory address pointer is located in a register in the CSR and can be incremented to reflect the address of the next CCB located in external memory.

After retrieving the channel control block from external memory, the controller logic overwrites the current channel control block located in the registers in the CSR block. If the chain bit of the CCB is set, the CCB count register, or alternatively, the external memory address pointer is incremented to point to the next channel control block. As the CCB is of a fixed size, the address of the next CCB is easily determined from the known address of the first externally located CCB incremented by the CCB count multiplied by the size of the CCB. Similarly, in the alternative embodiment, the external memory address pointer is updated by the controller logic by a fixed amount.

The external CCBs are loaded into internal memory at the same address the internal block is located. As a result, the initial CCB is overwritten. Therefore, at the end of a chain sequence of DMA operations, the controller logic 130 resets the pointer or counter to the initial address in external memory and restores the initial channel control block to the CCB register in the CSR block. Preferably a copy of the initial channel control block is stored in external memory at a predetermined address identified according to the channel control number and channel number (if a multiple channel system). The initial channel control block can be restored to the CSR at the end of a chain of sequence of DMA operations or, alternately, at the beginning of the next sequence of DMA operations to be initiated.

Figure 2B:
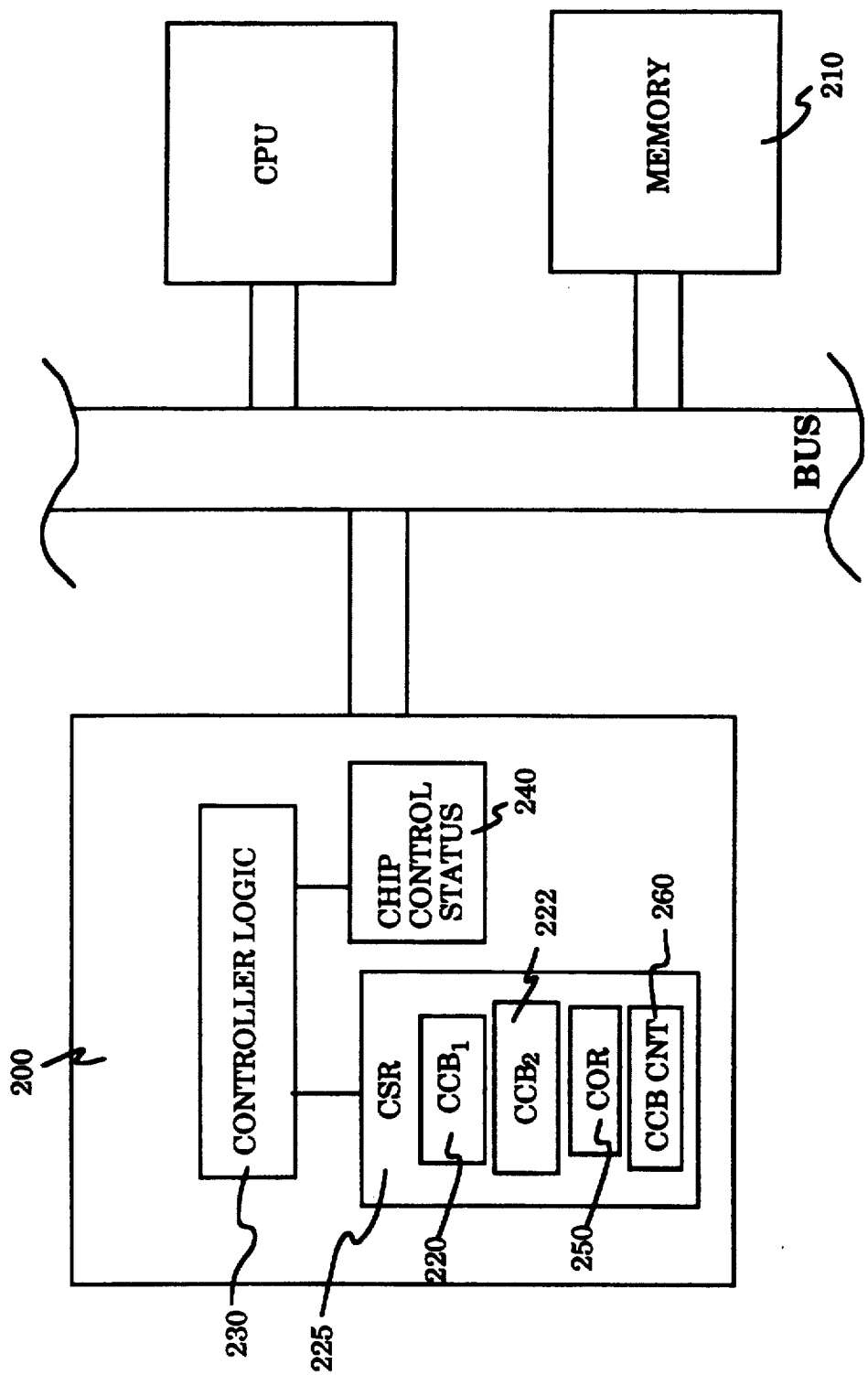

An alternative embodiment is shown in FIG. 2b. To further increase throughput, the internal memory of the controller 200 is increased slightly to accommodate a first 220 and second 222 channel control block. In addition, the chip control status bits 240 are expanded to include a bit to indicate the current channel control block. In this manner, double buffering may be performed. Double buffering is performed in the following manner. Referring to FIG. 2b, the first channel control block is located in $CCB_1$, 220 the first channel control block buffer. The chip control status bit 240 would indicate that the current channel control block is located in $CCB_1$, 220. While the controller logic 230 is processing in accordance with the channel control block located in $CCB_1$, 220, the chain bit in the CCB can be detected and the memory/read operation executed to retrieve the next channel control block from external memory, 210. The next CCB is then stored in $CCB_2$, 222 and the chip control status bit 240 is updated or toggled at the end of processing with respect to the channel control block located in $CCB_1$, 220, to reflect that the current channel control block is located in $CCB_2$ 222. Thus, at the end of processing with respect to the channel control stored in $CCB_1$ 220 the controller logic can immediately begin processing in accordance with the channel block located in $CCB_2$ 222. It follows that while the controller logic 230 is processing in accordance with the control block in $CCB_2$ 222, that the contents of $CCB_1$ 220 can be updated with the next channel control block retrieved from external memory 210. Thus, the time required to perform the memory read operation to retrieve the channel control block from external memory will not delay the initiation of the subsequent transfer, thus increasing the overall transfer rate.

Figure 3A:
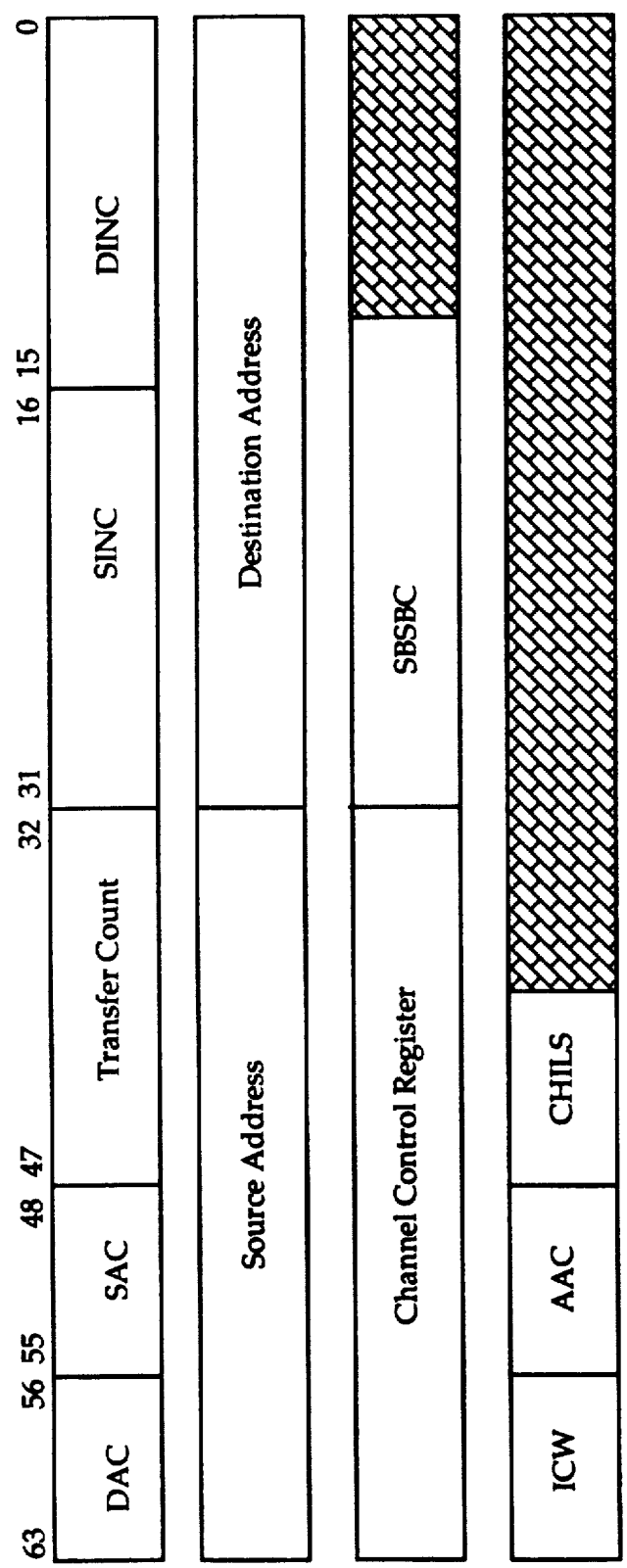

Each I/O controller includes a control/status register (CSR) block which contains information regarding the operating status of the controller as well as information referred to by the hardwired logic of the controller (controller logic) to perform DMA operations. Within the CSR block, a plurality of channel control blocks (CCBs) are located, one CCB for each I/O channel provided. An exemplary channel control block is illustrated in FIG. 3a. The first word contains the destination acknowledge counter (DAC), source acknowledge counter (SAC), transfer count (TC), source address auto increment/decrement register (SINC) and destination address auto increment/decrement register. The source and destination acknowledge counters are utilized for programmable wait-state specification of devices lacking an acknowledge line. The transfer count register specifies the number of bytes to transfer for the operation. The SINC and DINC registers store the values for auto incrementing/decrementing addresses for predetermined operations, such as transferring a block of data.

The first 32 bits contain the DMA source address identifying the address data is transferred from and the second 32 bits contain the destination address identifying the address the data is transferred to. The next 64 bits contain the channel control register (CCR) and slave burst capabilities register. As will be discussed below, the CCR contains bits for various operating parameters of the channel. The SBSDB specifies which burst sizes are supported for the particular slave device requesting the transfer. The initialize/chain/wait register (ICW) contains control bits for performing the operation including the chain bit, which when set, indicates that a CCB is located in external memory and is to be retrieved and executed. The register also includes an initialize status bit. When this bit is set, the CCB currently loaded in the CSR is the initial CCB and is ready for execution. If the initialized bit is not set, the initial CCB is not currently loaded in the CSR and before the DMA process can be re-initiated, the initial CCB must be loaded into the CCB register of the CSR.

The ICW register also contains a wait bit, which, as will be subsequently explained, when set suspends execution of CCB operations in order to dynamically configure chains of CCBs without incurring errors due to race conditions.

The auto-arm counter (AAC) is used in an auto-arm mode to specify the number of iterations of the CCB. The channel interleave size register (CHILS) specifies the maximum number of bytes to transfer before allowing another channel to transfer. The channel control register is set forth in detail in FIG. 3b. The channel control status bits are specified as follows:

Mo1, Mo0—Operation mode
  00—Single Transfer
  01—Auto-arm
  1x—Auto-execute
DXt—DMA X-fer type
  0—Controller is DMA master on Bus
  1—Controller is DMA slave on Bus
Sih—Source address auto increment/hold after each transfer.
  0—increment source address after each transfer based on transfer size
  1—hold source address constant
Dih—Destination address auto increment/hold after each transfer.
  0—increment destination address after each transfer based on transfer size
  1—hold destination address constant
Sec—Data bus endian conversion (source)
  0—BIG-endian
  1—LITTLE-endian
Dec—Data bus endian conversion (destination)
  0—BIG-endian
  1—LITTLE-endian
SaO—Source address override (scatter)
  0—no address override (normal mode)
  1—use current source base address for next CCB
DaO—Destination address override (gather)
  0—no address override (normal mode)
  1—use current destination base address for next CCB
Sai—Source address auto increment/decrement after each complete CCB transfer using value stored in SINC register.
  0—auto inc/dec disabled.
  1—auto inc/dec enabled.
Dai—Destination address auto increment/decrement after each complete CCB transfer using value stored in DINC register.
  0—auto inc/dec disabled
  1—auto inc/dec enabled
Sb1, Sb0—Source bus select
  00—Bus1, non-64 bit
  01—Bus1, 64 bit
  10—Bus2 type 1
  11—Bus 2 type 2
Db1, Db0—Destination bus select
  00—Bus1, non-64 bit
  11—Bus1, 64 bit
  10—Bus2 type 1
  11—Bus 2 type 2
SSync—Selects synchronous or asynchronous transfer for source.
  0—synchronous
  1—asynchronous
SMU—Selects multiplexed or non-multiplexed mode for source.
  0—non-multiplexed 1—multiplexed
SPs1, SPs0—Source port size for type-2 device (or type 1 device when ACK is ignored).
  00—64-bit
  01—32-bit
  10—16-bit
  11—8-bit
DSync—Selects synchronous or asynchronous transfer for destination.
  0—synchronous
  1—asynchronous
DMu—Selects multiplexed or non-multiplexed mode for destination.
  0—non-multiplexed
  1—multiplexed
DPs1,DPs0—Destination port size for type-2 device (or type 1 device when ACK is ignored)
  00—64-bit
  01—32-bit
  10—16-bit
  11—8-bit
Sack1,Sack0—Source acknowledge type control
For a type 2 device these bits will be ignored and mode 01 will always be used. This is because the *ACK line is not used with type 2 devices.
  00—observe *ACK line only.
  01—use value of SAC register in CCB only; ignore *ACK line.
  10—use value of SAC register in CCB, then observe *ACK line.
  11—observe *ACK line, then use value of SAC register.
Dack1,Dack0—Destination acknowledge type control
For a type 2 device these bits will be ignored and mode 01 will always be used.
  00—observe *ACK line only.
  01—use value of DAC register in CCB only; ignore *ACK line.
  10—use value of DAC register in CCB, then observe *ACK line.
  11—observe *ACK line, then use value of DAC register.

Dynamic chaining provides the flexibility to modify the chain of CCBs during processing. For example, to add a CCB, the chain bit of the last CCB in the chain is set and the CCB to be added is written to the next sequential memory address after the CCB. However, race conditions may arise when a chain of CCBs are dynamically modified. These race conditions can arise, for example, when the CCB is accessed from external memory while the CCB is being dynamically added to the chain of CCBs. A race condition can also arise when the last CCB in the chain is reached before a CCB can be dynamically added.

An innovative method and apparatus has been developed to avoid the occurrence of race conditions when dynamically chaining. As will be apparent to one skilled in the art from the following description, the method and apparatus of the present invention for the prevention of race conditions may be utilized with any dynamic chaining implementation; however, it is preferred that it is used in conjunction with the method and apparatus for dynamic chaining using external memory described herein.

In order to prevent race conditions, it is necessary to suspend progression in the chain of CCBs until the dynamic chaining operation is complete. A wait bit is provided in each channel control block. Upon detection of the wait bit, the controller logic will complete execution of the operation of the current control block but will suspend execution of subsequent DMA operations until that bit is reset. This provides the opportunity to dynamically add/modify channel control blocks to the the current chain in order to modify DMA operations without incurring errors due to race conditions. If it is desirable to chain additional DMA operations or insert or remove channel control blocks at particular locations in the chain of channel control blocks, the CPU causes the wait bit to be set in a channel control block which is prior to the location where a block is to be added or removed. The addition or deletion of the channel control block may then be performed and the wait bit reset, at which time the controller logic can continue processing of the DMA operations specified by the channel control blocks.

As noted above, in the preferred embodiment, the wait bit is located in the ISW register of the channel control block. Furthermore, it is preferred that an additional status bit, the suspend bit, be provided in the CSR (125, FIG. 1) preferably in the channel operation register (COR) (150, FIG. 1). The setting of this bit suspends operations without reference to a specific CCB. The suspend bit may be used in conjunction with or exclusive of the wait bit located in each CCB. In a multiple-channel controller, a plurality of suspend bits are provided, one for each channel, thus providing a simple technique for suspension of all or some channel operations. Upon resetting of the suspend bit, operations are permitted to continue.

Figure 4A:
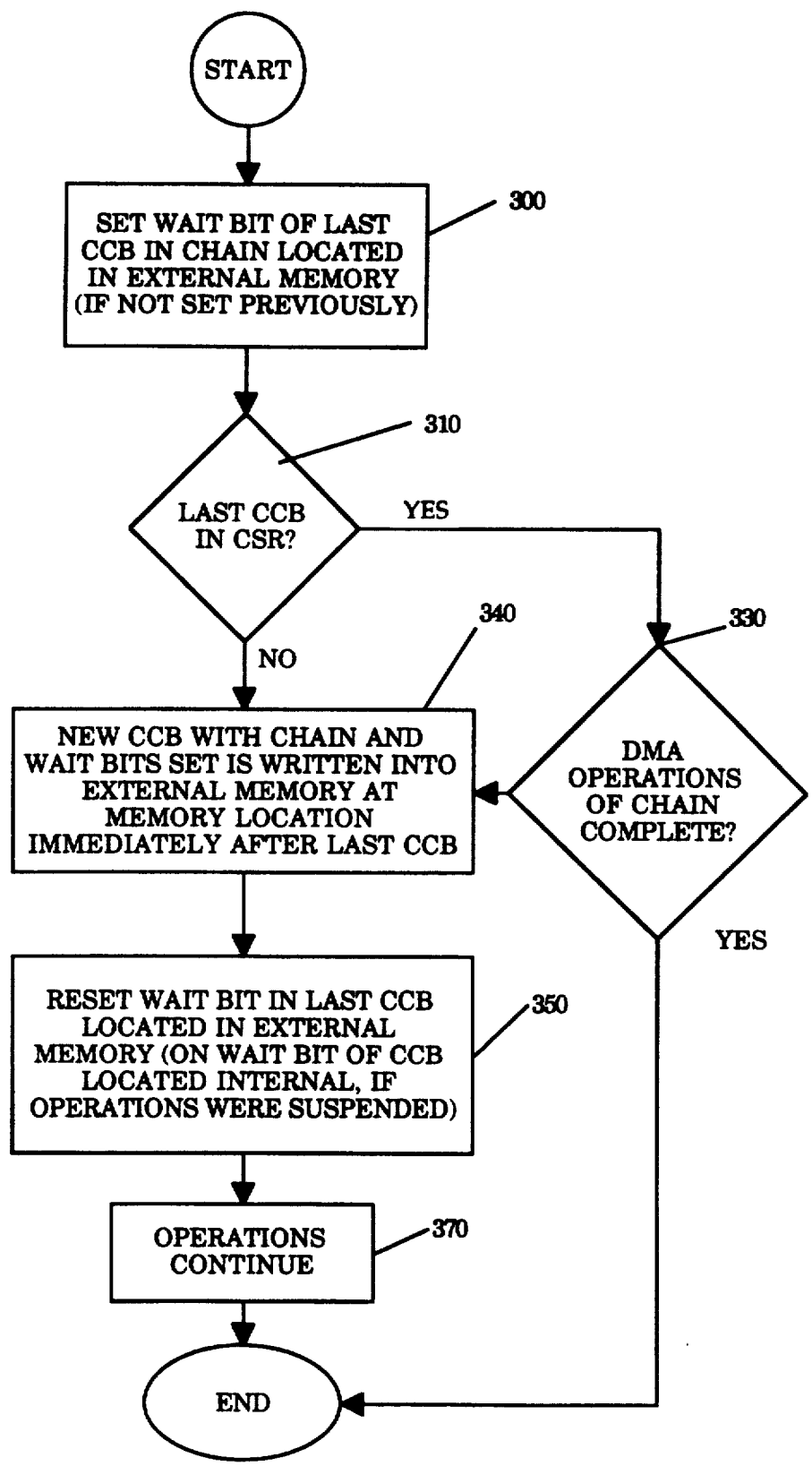
FIGS. 4a, 4b and 4c are flow diagrams illustrating the preferred embodiment for the prevention of race conditions during dynamic chaining operations.

An example of dynamic chaining, illustrated by the flowchart of FIG. 4a, would be to add DMA operations on to the end of a chain of CCBs. To do this, the CPU, or other device having the capability to program the I/O controller, accesses the external memory, and, if not set previously, sets the wait bit of the last CCB in the chain located in external memory, step 300. The wait bits can be preset if it is probable that dynamic chaining will occur. By presetting the wait bit, the risk of overrunning the location prior to dynamic chaining additional CCBs is avoided. If the last channel control block is currently located in the CSR of the I/O controller, step 310, and the DMA operations of the chain are complete, step 320, the dynamic chaining operation cannot be performed and an alternative process will have to take place, such as executing the CCB as a separate chain. Processing continues until the controller logic detects the set wait bit and operations are suspended. The CPU then writes, step 340, the new channel control block in the memory location immediately following that last channel control block in external memory. Preferably the chain and wait bits of the new CCB added are preset as it is likely that additional CCBs may be added.

After the write operation is complete, the wait bit is reset in the CCB located in both the external memory and in the CSR (if operations suspended), step 350, whereby processing is resumed, step 370, and dynamic chaining is achieved. By first setting the wait bit, the possibility of race conditions (overrun) is eliminated as the controller logic will not process beyond the channel control block having the wait bit set. Furthermore, the controller logic can continue processing up to the end of the channel control block having the wait bit set, thereby minimizing the processing overhead for dynamic chaining and maintaining a high throughout.

Figure 4B:
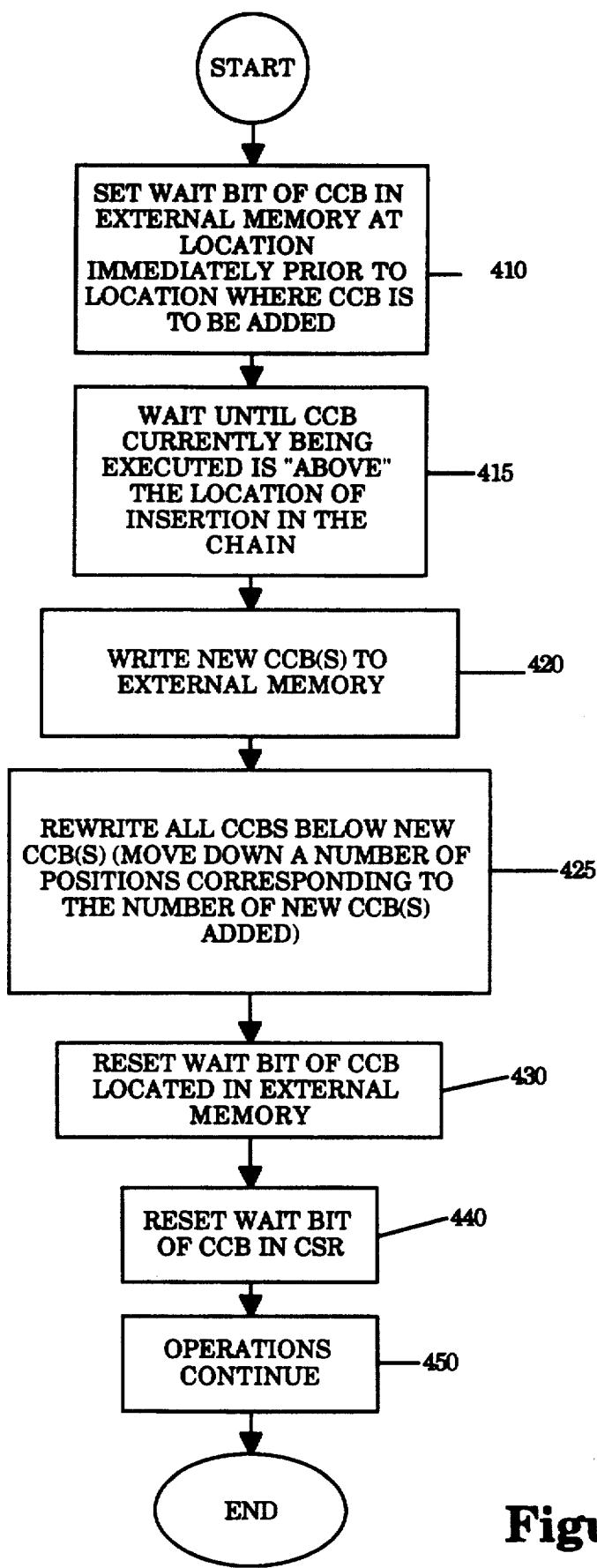
Figure 4C:
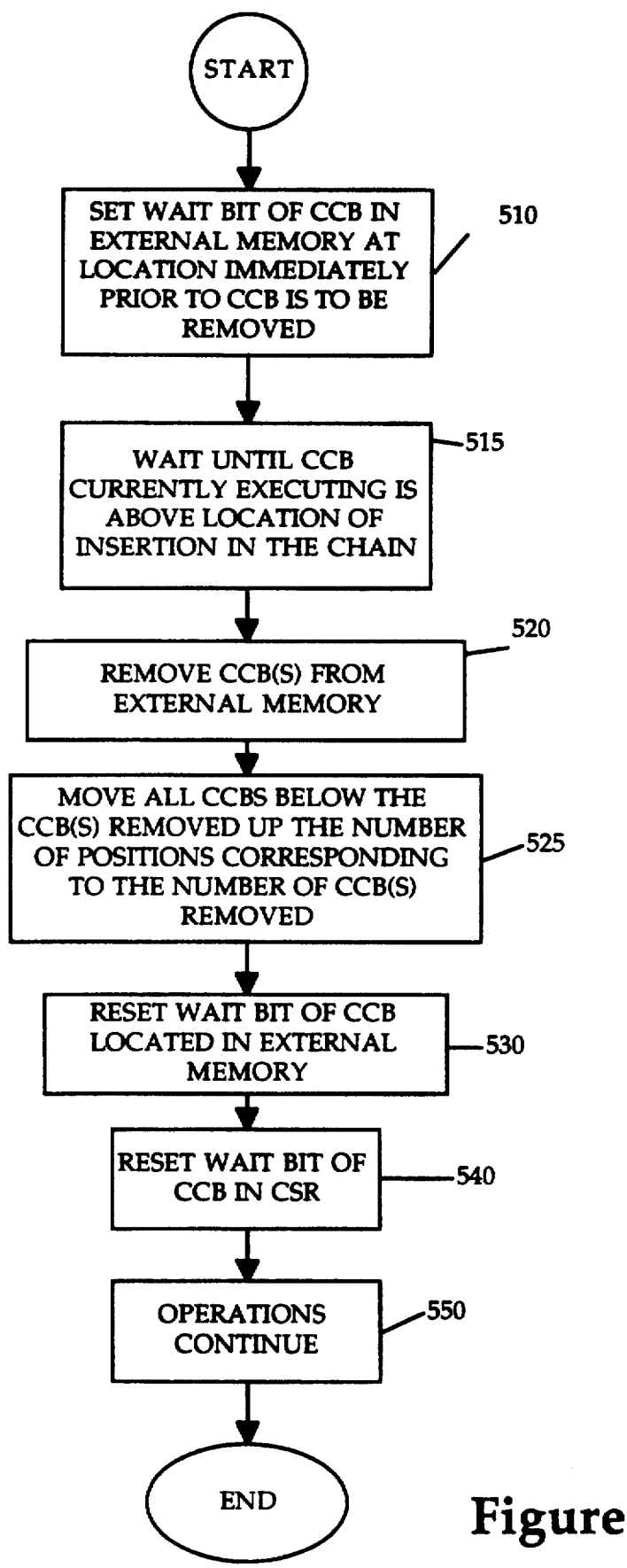

A CCB may also be added within the chain of CCBS currently specified. The following illustration, as set forth in FIG. 4b, describes the process in the context of a recursive chain, i.e. a chain which recycles to the top of the chain after completion of the chain. The process of the present invention is not limited to recursive chains, and the process can be equally applied to non recursive chains. Referring to FIG. 4b, the wait bit of the CCB located in the chain immediately prior to the location of the CCB to be added is set, step 410. At step 415, the location of the CCB currently processing is compared to the location where the CCB is to be added. If the CCB currently processing is "lower" in the chain, the system waits until the operations cycle back to the top of the chain before writing the new CCBs into memory. If the CCB currently processing is above the location in the chain where the CCB is to be added, the CCB can be immediately added as the system will suspend processing upon detecting the wait bit set. The external memory is then updated to add the new CCB, step 420. This is preferably accomplished by writing the new CCB at the memory address immediately following the CCB which has the wait bit set and rewriting the remaining subsequent CCBs at new address locations corresponding to each old address incremented by the size of one CCB, step 425. Alternatively, the external memory may be updated by writing the CCB in a subsequent memory address and providing a pointer mechanism to that address such that the new CCB is executed in the sequence desired. Once the chain is updated, the external wait bit is reset, step 430, after shich the internal wait bit is reset, step 440, and processing is continued, step 450.

Another example of a dynamic chaining operation, illustrated by the flow chart of FIG. 4b, is the removal of a CCB from an active chain of CCBs. FIG. 4b illustrates the process of removing a CCB from a recursive chain of CCBs. The removal of one or more CCBs is accomplished by first setting the wait bit in the external CCB immediately prior to the CCB to be removed, step 510. At step 515, the system determines the location in the chain of the CCB to be removed relative to the location of the CCB currently processing. The system will wait, if necessary, until the CCB processing is "above", or prior to the location of the CCB to be removed. The CCB is then removed from the external memory, step 520. The external memory may contain a pointer mechanism to point to the address of the CCB immediately subsequent to the CCB removed, such that there is no discontinuance in the chain of CCBs. Alternately, step 525, the CCBs subsequent to that removed are rewritten to external memory in contiguous memory addresses. After the chain of the CCBs have been updated, the wait bit in the CCB located in external memory is first reset, step 530, and the wait bit in the CCB in the CSR is reset, step 540, to continue processing, step 550.

While the inventions have been described in conjunction with the preferred embodiments, it is evident that numerous alternatives, modifications, variations and uses will be apparent to those skilled in the art in light of the foregoing description. In particular, one skilled in the art would realize that the concepts described herein, the transparent chaining of external channel control blocks and the prevention of race conditions when dynamically chaining operations, are preferably used in conjunction with one another, but can also be used exclusive of one another and still achieve the objects and improvements discussed herein.

I claim:

1. In a computer system comprising a CPU, memory, and I/O storage devices coupled to a bus, an apparatus for dynamically chaining direct memory access operations to be performed to said I/O storage devices comprising:

a direct memory access (DMA) controller, coupled to said bus, for performing DMA operations, said DMA controller comprising DMA controller logic and at least one channel control block register accessed by said DMA controller comprising a channel control block (CCB) identifying DMA transfer parameters which specify an operation to be performed by said DMA controller, said DMA controller logic performing operations in accordance with the CCB, said CCB comprising a wait status bit, said wait status bit indicating to the DMA controller logic to suspend processing until the wait bit is reset;

an I/O storage device, external to and coupled through said bus to said DMA controller, from which said DMA controller retrieves at least one next CCB to be processed subsequent to a first CCB; and said DMA controller further comprising chip control status coupled to said DMA controller logic for providing to said DMA controller logic status regarding DMA operations to be performed, said chip control status comprising an external memory address pointer which identifies an address in the I/O storage device external to said DMA controller of the next CCB to be processed, said external memory address pointer being incremented after each access to a CCB in the I/O storage device to point to the next CCB in a chain of CCBs to be processed;

if said wait bit is not set, said DMA controller reading the external I/O storage device at the address specified by the external memory address pointer, storing the CCB read in the CCB register and processing the CCB to perform operations in accordance with the CCB located in the CCB register; and an external processor coupled to said bus for setting and resetting the wait bit in a CCB prior to the location of a CCB to be added and/or removed from the chain of CCBs, said external processor enabled to dynamically modify the chain of CCBs to produce a modified chain of CCBs by setting the wait bit, adding and/or removing at least one CCB, resetting the wait bit, wherein processing continues in the modified chain of CCBs;

whereby said DMA controller can dynamically modify a chain of operations by modifying a chain of CCBs without increasing the amount of memory required in said DMA controller and without incurring errors due to race conditions.

2. The apparatus for dynamically chaining direct memory access operations as set forth in claim 1, wherein said DMA controller further comprises a suspend status bit, which when set, suspends performance of operations specified by CCBs after the operation specified by the CCB currently stored in the CCB register is completed, whereby the chain of CCBs can be modified while the suspend status bit is set without incurring race conditions.

3. The apparatus for dynamically chaining direct memory access operations as set forth in claim 1, wherein said DMA controller performs multiple channels of DMA operations and a suspend status bit is provided for each channel, whereby one or more channels can be suspended to dynamically modify chains of CCBs.

4. In a computer system comprising a CPU, memory, I/O storage devices, and a direct memory access (DMA) controller for performing DMA operations with respect to the I/O storage devices, said CPU, memory, I/O storage devices, and DMA controller being coupled by a bus, a method for performing a chain of operations for direct memory access to I/O storage devices and dynamically modifying the chain of operations comprising the steps of:

identifying with an external memory address pointer the address in an I/O storage device external to said DMA controller of a next channel control block (CCB) to be processed subsequent to a first CCB, said DMA controller comprising at least one CCB register, said CCB register containing a CCB identifying DMA transfer parameters to be processed by said DMA controller which specify an operation to be performed by said DMA controller, said CCB comprising a wait bit;

said DMA controller performing DMA operations with respect to the I/O storage devices, the operations being specified by the CCB located in the CCB register;

upon completion of performing DMA operations and if said wait bit is not set by an external processor, retrieving a subsequent CCB from the external I/O storage device at the address identified, storing the subsequent CCB in the CCB register, said DMA controller processing the subsequent CCB located in the CCB register, and identifying with the external memory address pointer the address in an I/O storage device external to said DMA controller of the next CCB to be processed by incrementing said external memory address pointer; upon completion of performing DMA operations and if said wait bit is set, suspending processing of CCBs by said DMA controller, determining when the wait bit is reset, modifying the chain of CCBs, resetting the wait bit after the chain of CCBs has been modified, and resuming processing of CCBs by said DMA controller when the wait bit is reset.

5. The method as set forth in claim 4, said method further comprising the step of adding a CCB to a chain of CCBs, said step comprising the steps of:

an external processor setting a chain bit of the CCB in external memory immediately prior to the location of the CCB to be added;

adding the CCB to the chain of CCBs at the I/O storage location immediate subsequent to the location of the CCB with the wait bit set; and resetting the wait bit of the CCB located immediately prior to the location of the CCB to be added;

whereby a CCB is dynamically added to the chain of CCBs to be processed without incurring errors due to race conditions.

6. The method as set forth in claim 5, wherein if the CCB stored in the CCB register at the time the wait bit is set the CCB immediately prior to the location of the CCB to be added, said method further comprises the steps of:

setting the wait bit in the CCB stored in the CCB register whereby processing is suspended after the operation specified by the CCB in the CCB register are completed;

after the chain of CCBs has been modified and the wait bit of the CCB immediately prior to the location of the CCB to be added has been reset, resetting the wait bit of the CCB located in the CCB register.

7. The method as set forth in claim 4, further comprising a method for dynamically modifying the chain of CCBs while the DMA controller is processing CCBs by removing a CCB from the chain, said method comprising the steps of:

setting the wait bit of the CCB immediately prior to the location of a CCB to be removed;

removing the CCB to be removed;

if the CCB to be removed is not the last CCB of the chain, updating the addresses of the locations of the CCBs subsequent to the removed CCB such that the CCB following the CCB removed is addressed immediately subsequent to the CCB immediately prior to the location of the removed CCB;

if the CCB to be removed is the last CCB of the chain, resetting the chain bit of the CCB immediately prior to the CCB to be removed; and resetting the wait bit of the CCB immediately prior to the location of the CCB to be removed;

whereby a CCB is dynamically removed from the chain of CCBs to be processed.

8. The method as set forth in claim 4 further comprising the step of providing a suspend status bit in the DMA controller, wherein if said suspend bit is set and the operation specified by the CCB located in the CCB register is complete, suspending further processing until the suspend is reset, whereby the chain of CCBs is modified without incurring race conditions while the suspend bit is set.

9. The method as set forth in claim 8, wherein if the CCB stored in the CCB register at the time the wait bit is set is the CCB immediately prior to the location of the CCB to be added, said method further comprises the steps of:

setting the suspend bit in the CCB stored in the CCB register whereby processing is suspended after the operation specified by the CCB in the CCB register are completed;

after the chain of CCBs has been modified and the wait bit of the CCB immediately prior to the location of the CCB to be added has been reset, resetting the suspend bit of the CCB located in the CCB register.

10. The method as set forth in claim 9, wherein if the CCB stored in the CCB register at the time the wait bit is set is the last CCB of the chain and the chain is to be modified by adding a CCB to the end of the chain, said method further comprises the steps of:

setting the suspend bit whereby processing is suspended after the operation specified by the CCB in the CCB register is completed;

setting the chain bit of the last CCB in the chain;

adding the CCB to the chain of CCBs at the location immediately subsequent to the last CCB in the chain;

resetting the suspend bit;

whereby a CCB is added to the end of the chain of CCBs.

11. In a computer system comprising a CPU, memory, and I/O storage devices coupled to a bus, an apparatus for dynamically chaining direct memory access operations to be performed to said I/O storage devices comprising:
- a direct memory access (DMA) controller, coupled to said bus, for performing DMA operations, said DMA controller comprising DMA controller logic and at least one channel control block register accessed by said DMA controller comprising a channel control block (CCB) identifying DMA transfer parameters which specify an operation to be performed by said DMA controller, said DMA controller logic performing an operation in accordance with the CCB, said CCB comprising a chain status bit and a wait status bit, said chain status bit indicating to said DMA controller logic that a subsequent operation is to be performed as specified by another CCB, said CCB register initially storing a first CCB, said wait status bit indicating to said DMA controller logic to suspend processing until the wait bit is reset;
- an I/O storage device, external to and coupled through said bus to said DMA controller, from which said DMA controller retrieves at least one next CCB to be processed subsequent to a first CCB; and
- said DMA controller further comprising chip control status coupled to the DMA controller logic for providing to said DMA controller logic status regarding DMA operations to be performed, said chip control status comprising an external memory address pointer which, when the chain bit is set, identifies an address in the I/O storage device external to said DMA controller of a next CCB to be processed, said external memory address pointer being incremented after each access to a CCB in the I/O storage device to point to the next CCB in a chain of CCBs to be processed;
- said DMA controller reading the external I/O storage device at the address specified by the external memory address pointer, storing the CCB read in the CCB register and processing the CCB to perform operations in accordance with the CCB located in the CCB register; and
- an external processor coupled to said bus for setting and resetting the wait bit in a CCB prior to the location of a CCB to be added and/or removed from the chain of CCBs, said external processor enabled to dynamically modify the chain of CCBs to produce a modified chain of CCBs by setting the wait bit, adding and/or removing a CCB, and resetting the wait bit, whereby processing continues in the modified chain of CCBs;
- whereby said DMA controller can dynamically modify a chain of operations by modifying a chain of CCBs without increasing the amount of memory required in said DMA controller and without incurring errors due to race conditions.

12. The apparatus as set forth in claim 11, further comprising a suspend bit located in the DMA controller, said suspend bit when set, suspends processing after completion of the operation currently located in the CCB register.

* * * * *